United States Patent [19]

Zabel

[11] Patent Number: 4,710,295

[45] Date of Patent: Dec. 1, 1987

[54] SEPTIC TANK FILTERS

[76] Inventor: Robert Zabel, 9315 Fairground Rd., Louisville, Ky. 40291

[21] Appl. No.: 778,349

[22] Filed: Sep. 9, 1985

Related U.S. Application Data

[63] Continuation-in-part of Ser. No. 639,129, Aug. 9, 1984, abandoned.

[51] Int. Cl.$^4$ .............................................. B01D 25/02
[52] U.S. Cl. .................................. 210/336; 210/488; 210/521; 210/532.2
[58] Field of Search ..................... 210/532.2, 488, 489, 210/299–301, 316, 320, 335, 336, 345–347, 340, 521

[56] References Cited

U.S. PATENT DOCUMENTS 3,240,343  3/1966  Werner ........................ 210/532.2 X
3,332,552  7/1967  Zabel ........................... 210/532.2 X Primary Examiner—Tom Wyse
Attorney, Agent, or Firm—Edward M. Steutermann

[57] ABSTRACT

A filter unit for use in a casing disposed in a septic tank which includes a plurality of stacked disc-dam units to form a cartridge having a longitudinal on each disc-dam unit having a generally circular planar base having a chord edge where the chord edge of each disc-dam is in mutual alignment so that first and second sealing edges are formed at the respective ends of the chord edge where the first and second sealing edges are parallel to the longitudinal axis and where each disc like base includes a continuous elongate dam located on one side of the base and extending outwardly therefrom to terminate at a dam top where the elongate dam has a dam first end adjacent the first sealing edge and extends continuously to a dam second end at said second sealing edge to divide the base into an upstream and downstream side with retaining device to hold the disc-dam units in stacked relation with selected spacing between the dam top of one disc-dam unit and the surface of the next base.

Also, the filter unit can be disposed in a cylindrical casing having an open inlet at the bottom where a frustro conical deflector is placed over the inlet so liquid can enter the device by flowing through an annular area between the housing and the base of the deflector and solids carried by the liquid are emitted through the opening formed at the apex of the deflector.

4 Claims, 8 Drawing Figures

SEPTIC TANK FILTERS

BACKGROUND OF THE INVENTION

This application is a continuation in part for Ser. No. 639,129, filed 8/9/84 now abandoned.

The present invention relates generally to septic systems and relates more particularly to filter units for use with septic tanks.

More particularly, the present invention relates to improvement of filter units disclosed and claimed in my prior U.S. Pat. No. 3,332,552 which was an improvement on my U.S. Pat. No. 2,900,084, granted Aug. 18, 1959, disclosing: (A) a septic tank having its interior arranged to provide a U-shaped path of flow wherein (1) one leg of the U constitutes and upstream chamber which receives incoming sewage through a tank inlet at a high inlet level and is normally filled therewith up to an intermediate stagnant level spaced substantially below the high inlet level and (2) the other leg of the U constitutes a downstream chamber which receives partly or completely digested sewage from the upstream chamber through the bight of the U and is normally filled therewith up to said intermediate stagnant level and which discharges a clarified effluent through the tank outlet as and when additional sewage pours into the upstream chamber and thus causes the downstream chamber to overflow its stagnant level; (B) a cylindrical casing vertically arranged within the outlet end portion of the tank to form the downstream chamber with an inlet opening at its bottom and with a side wall outlet at the top side of the stagnant level; and (C) an outlet trap arranged within the casing (1) to screen or strain solids from the fluid material overflowing the downstream chamber and (2) to provide an outlet passageway directing that overflow into the tank outlet.

The outlet trap, a heavy base-dam unit composed of a horizontally elongate, sinuous, overflow dam which extends back and forth across a somewhat circular arc proceeding from one side of the tank outlet to the other; a concrete base plate supporting the dam and providing a shelf on the upstream side of the dam and the floor of the outlet passageway on the downstream side of the dam; and an overlying member cooperating with the upper edge of the dam to form a horizontally-elongate vertically-narrow outlet slot of substantial length and providing an overhanging canopy on the upstream side of the dam and a ceiling for the outlet passageway on the downstream side of the dam. With this arrangement, the slot can be made extremely narrow and correspondingly efficient in straining solids from the water and still provide an outlet opening of substantial water-passing capacity even when clogged with solids over a considerable portion of its length.

U.S. Pat. No. 3,332,552 teaches means to improve the outlet trap in several respects viz: to effect a substantial increase in discharge capacity, length of maintenance free operation and in the purity of its effluent; and substantially reduce the liquid inlet velocity and any tendency to clog.

Prior art septic tanks have been conventionally provided with outflow traps. While many prior art traps work subsfactorily must clog from time to time and a clogged trap is discovered only after the stagnant level with the septic tank rises sufficiently above the lowest inlet level to prevent incoming sewage from flowing into the tank.

The objects of my prior patent have been achieved by substituting, for the concrete base plate of the septic tank base-dam unit, in accordance with the patents including a thin lightweight disc, preferably composed of plastic, so that, it cooperates with an upstanding strip, to form a disc-dam unit; where a stack composed of a number of these disc-dam units is arranged in vertically spaced superposed relationship such that the bottom of each overlying unit cooperates with the upper edge of each underlying unit to form a horizontally-elongate vertically-narrow outlet slot and mounting the stack within the cylindrical casing with several slots located above and several located below the stagnant level so that the stack not only divides the downstream chamber into two compartments, one receiving digested sewage through the bottom opening of the casing and the other discharging clarified effluent through said side wall outlet, but also enables the receiving compartment to discharge into the discharge compartment through a large normally submerged area permitting flows below the stagnant level and another large normally unsubmerged area accommodating substantial overflow above the stagnant level.

It has been found that when filter units of the type disclosed in my prior U.S. patents are provided in a septic tank and mounted to submerge one or more slots below the stagnant level, the resulting increase in discharge capacity effects a corresponding reduction in the velocity of flow through the outlet slots and, with this latter reduction, there is a substantial lessening of the tendency of the liquid flowing into the trap to carry solids with it. There is a corresponding increase in the purity of its effluent. The same is true when a stack of this character is mounted to provide several slots above the stagnant level.

It has also been found that undigested solids tend to collect on the submerged shelves and to remain there undisturbed by the liquid which slowly passes through the outlet slots so that they are ultimately completely digested and thus converted into ash. Furthermore, by providing these shelves with a large number of perforations, the ash will ultimately sift downwardly through these openings rather than build up an ash deposit high enough to reach the slots. Finally, if the submerged slots and those within the normal overflow range of the trap become clogged, the stagnant level itself will rise to a point where its overflow can pass through the still higher slots so that the trap thereby continues to provide a satisfactory operation.

SUMMARY OF THE PRESENT INVENTION

The present invention generally provide improvements in my prior U.S. Pat. Nos. 2,900,084 and 3,332,552.

More particularly, the present invention provides means to provide an improved filter cartridge which is adapted to eliminate the hanger means used in devices in accordance with the prior patents yet easily removed from a casing and where improved seal means are provided to facilitate operation of the device.

Further improvements in accordance with the present invention permits lower manufacturing cost, provide improved operating characteristics by even further reducing the possibility of clogging of the unit and reducing the size of units.

Another important feature of devices in accordance with the present invention is the effect of retention of solids and particulate matter which would normally be released to the drain field from the tank. This retention changes the chemical posture of the tank. Organic material particles and solids function as nutrients providing valuable nutrition to anaerobic bacteria within the tank. Because the solid matter and particulate matter are retained in the tank, the number and types of anaerobic bacteria becomes enriched so than in direct proportion of the food supply, the number of bacteria increases. Increased microbiological life becomes evident and digestion of all incoming substances is greater, thereby reducing sludge build-up.

It has further been found that the use of a deflector at the inlet to the unit further enhance the advantages thereof and provides longer more efficient operation.

A filter unit for use in a casing disposed in a septic tank which includes a plurality of stacked disc-dam units to form a cartridge having a longitudinal on each disc-dam unit having a generally circular planar base having a chord edge where the chord edge of each disc-dam is in mutual alignment so that first and second sealing edges are formed at the respective ends of the chord edge where the first and second sealing edges are parallel to the longitudinal axis and where each disc like base includes a continuous elongate dam located on one side of the base and extending outwardly therefrom to terminate at a dam top where the elongate dam has a dam first end adjacent the first sealing edge and extends continuously to a dam second end at said second sealing edge to divide the base into an upstream and downstream side with retaining device to hold the disc-dam units in stacked relation with selected spacing between the dam top of one disc-dam unit and the surface of the next base.

Also, the filter unit can be disposed in a cylindrical casing having an open inlet at the bottom where a frustro conical deflector is placed over the inlet so liquid can enter the device by flowing through an annular area between the housing and the base of the deflector and solids carried by the liquid are emitted through the opening formed at the apex of the deflector.

While various arrangements within the scope of the present invention will occur to those skilled in the art upon reading the disclosure set forth hereinafter, but one example in accordance with the present invention is shown in the accompanying figures and described hereinafter.

BRIEF DESCRIPTION OF THE DRAWINGS

In the one example in accordance with the present invention shown in the Figures.

DETAILED DESCRIPTION OF THE DRAWINGS

Figure 1:
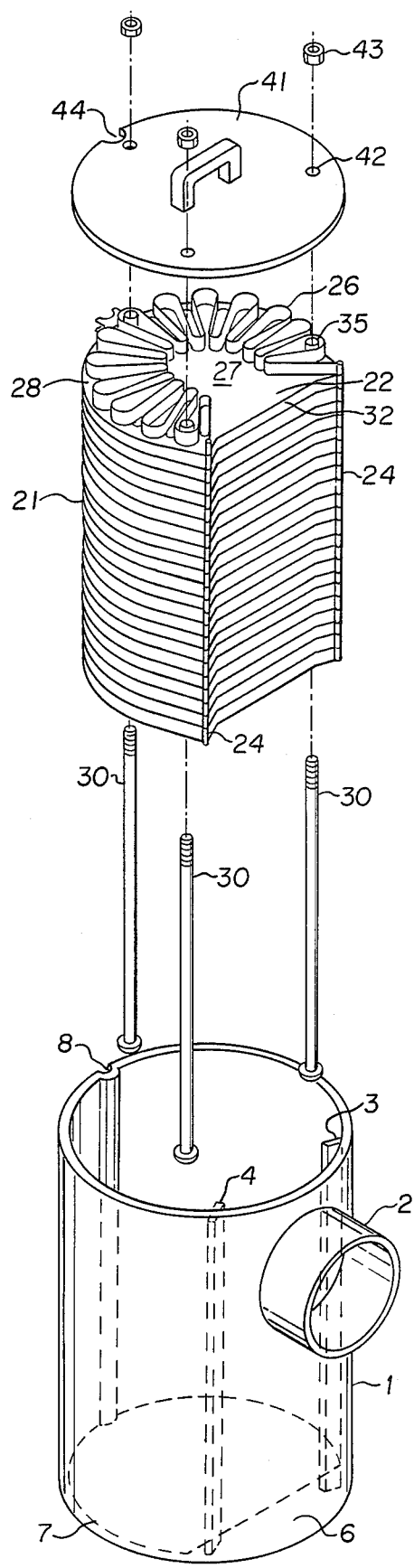
FIG. 1 is an exploded perspective view of an example of an assembly within the scope of the present invention.

Referring to FIG. 1, which is an exploded perspective view of one arrangement within the scope of the present invention, a casing 1 is provided which can be made of any suitable material such as plastic, and further for example a thermoplastic material such as polyethylene or other suitable materials. An outlet 2 is provided which can be, for example, a female or male connection for connection to a cooperative outlet (not shown).

Longitudinally extending seal members 3 and 4 are provided within casing 1 to extend generally the length of the casing, as shown, for engages the filter cartridge, as described hereinafter.

Casing 1 is generally circular, and includes a lip 6 extending across a chord of the circular cross section of the casing, as shown, providing an opening 7 which, in operation, is located within the septic tank and adapted to permit flow of sewage into the casing 1. Lobe 8 is provided along one longitudinal edge of casing 1 to receive notches in the filter disc, as described hereinafter, to align the disc within the casing. A filter cartridge 21 is provided having filter disc 22 of generally circular cross section with a chord section 23 cut, as shown, where lips 24 are provided, also as shown, to engage seal members 3 and 4 when the cartridge is in position within casing 1. As described hereinafter and as described more particularly in U.S. Pat. No. 3,332,552 each of the disc 22 constitutes a disc-dam unit which can be made of a suitable material, for example a plastic including a thermoplastic. Each unit comprises an elongate sinuous over-flow dam 26 which extends from one of the edges 24 to the other edge 24 in a serpentine path on top of the disc 22. Of the strip 26 extends vertically and a dam is located on each disc 22. Portion 27 on one side of the dam unit forms an outlet while the portion 28 on the opposite side of the dam unit 26 forms an inlet side for each of the leaves. Shown in FIG. 2, slots 31 are provided between the turns of the dam member 26 to permit ash return through the inlet 7 of the casing, as described hereinafter.

Figure 4:
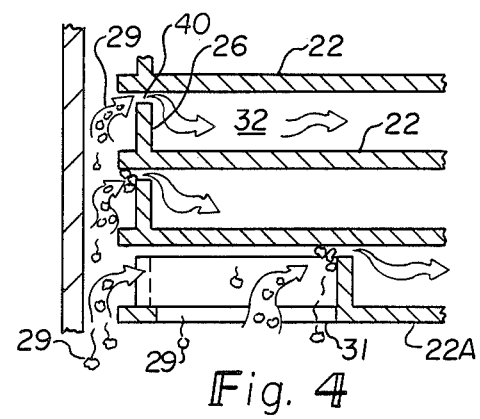
FIG. 4 is a segmental view showing method of operation of the device shown in FIG. 1.

In this regard attention is directed to FIG. 4 where the flow is shown being over a dam member 26 into the chamber 32 formed within the dam member 32, so that clean fluid is emitted to chamber 32 while the particulate matter 29 carried in the liquid falls out, as shown, as the liquid passes through the space 37 between the dam member 26 and the under side of the next disc 22. The bottom most plate 22A in FIG. 4 illustrates the flow of liquid through one of the slots 31 and the similar removal of the particles 29.

Figure 2:
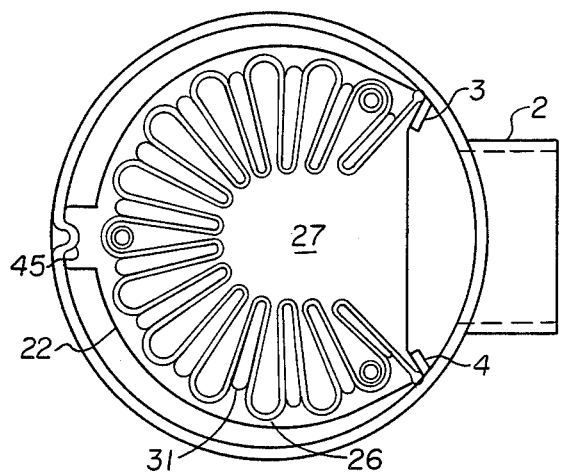
FIG. 2 is a top view of the assembly shown in FIG. 1.

Referring again to FIG. 1, it will seen that the entire filter cartridge can be assembled on bolt 30 which extend longitudinally through holes 35 provided within the assembly. A cover 41 can be provided having apertures 42 to receive the rods 30 while nuts 43 can be provided to secure the lid and the disc 22. As previously describe, a notch 44 is provided in lid 41 and a cooperative notch 45 is provided within each of the disc 22, as shown in FIG. 2, to receive the lobe 8, previously described.

Figure 3:
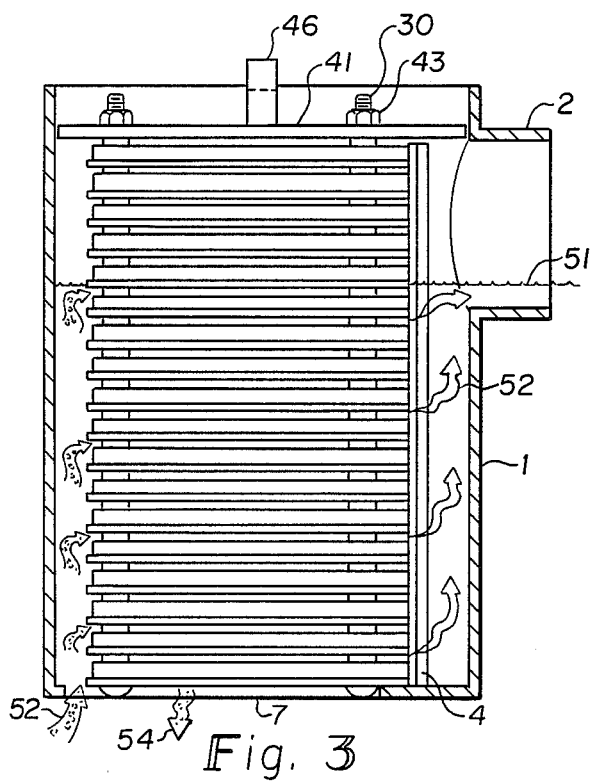
FIG. 3 is a side elevational view, in section, of the arrangement shown in FIG. 1, in assembled form.

It will be understood that when the filter unit, shown in FIG. 1, is completely assembled with the rods 30 extending through the length of the stacked filter members and the lid 41 attached thereto, the entire unit is located in the filter body 1, as shown in FIG. 3, with handle 46 extending upwardly from lid 41. The unit can then be simply removed from the casing 1 which can then be permanently implanted into the septic system. In FIG. 3 the level of material 51 is shown in the outlet 2 where the clear liquid 2 is shown being emitted from the chord edges 23 of the filter cartridge and the fluid 52 bearing the particulate matter 53 is shown entering through opening 7.

In operation the device is submerged within the septic tank so that the liquid will normally rise and flow out of outlet 2 to associated piping (not shown) and the particulate matter is removed from the dirty inlet fluid 52. The ash then falls outwardly through the inlet 7 which is shown by arrow 54 and to the bottom of the tank for further digestion.

Figure 5:
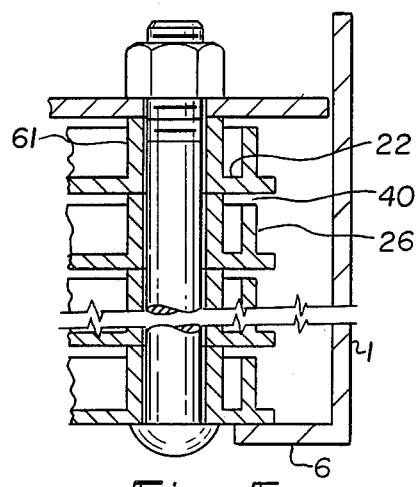
FIG. 5 is a segmental view of the orientation of discs in the assembled unit.

The size of the particulate matter to be removed and the size then to be allowed to pass is determined by the spacing 31 between the bottom of a disc 22 and the top of a dam 26 as illustration in more detail in FIG. 5. FIG. 5 is a cup view of the entire assembly showing the bottom of the device located on the bottom 6 of the casing 1. The spacing is determined by the height of post 61, as shown, where it will be understood that in the manufacture of the disc-dam units, can be placed in the mold to determine the height of post 61 and thus the clearance 31 between the top of the disc-dam 26 and the bottom of the next adjacent disc 22, as illustrated. In operation, when the septic tank is operating at equilibrium conditions an amount of sewage effluent flows from outlet 2 equal to the amount of sewage entering the septic tank during a given period of time. Openings of the slots 31 and the spacings 40 are selected to provided minimal distrubance of the material flowing through the device so that there is little break up of the solids and the maximum solids are return to the tank for further digestion. In the event of a stagnant condition where the slots of the spaces 40 between the tops of the dam 26 and the bottom of the next adjacent plate 22 become clogged the liquid level simply rises higher and utilizes the next highest level of filter area until the clogging condition normally cures itself and observes that the effluent discharged from the present unit, and from the past unit is exceptionally clear and that the effluent is for introduction into drainage field.

Figure 7:
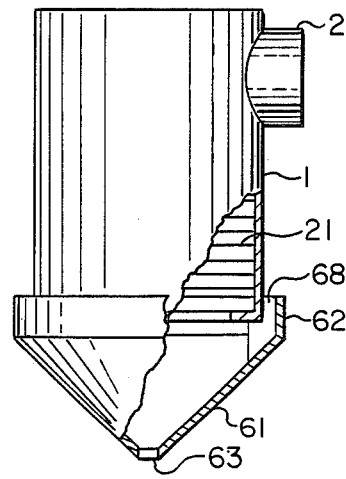
FIG. 7 is an elevational view, partially in section of the arrangement shown in FIG. 6 in assembled form.
Figure 6:
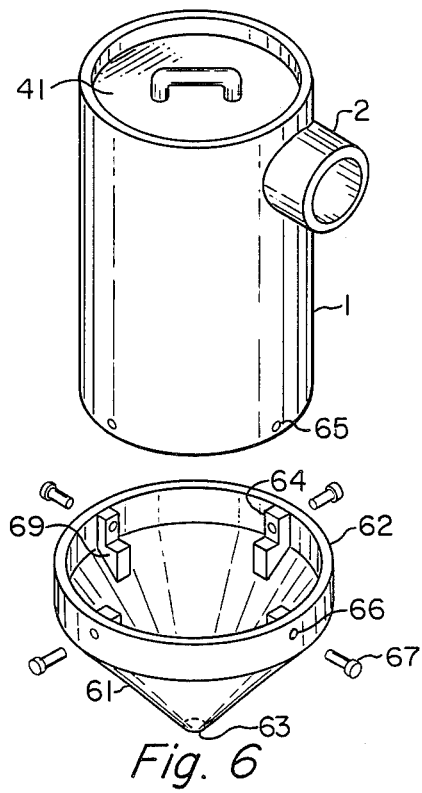
FIG. 6 is an exploded, perspective view of a deflector for a filter arrangement of the type shown in FIG. 1.
Figure 8:
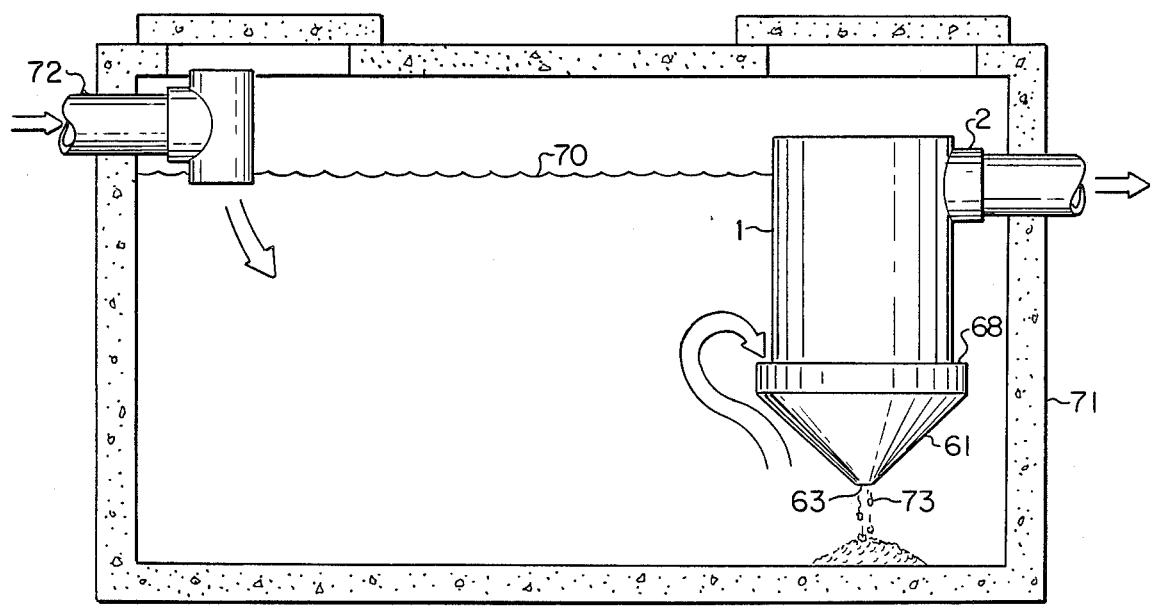
FIG. 8 is a view of the arrangement shown in FIG. 7 in a sptic tank.

Referring now to FIGS. 6-8 which illustrate another arrangement within the scope of the present invention, and referring specifically to FIG. 6, a casing 1 of the type shown in FIG. 1 having a lid 41 and an outlet 42 is shown where the filter plates 21 is shown in FIG. 7 are located within the casing 1 as previously described.

In accordance with another feature of the present invention of the present invention it has been found useful to utilize a deflector means at the inlet of the device to further enhance the advantages provided by devices within the scope of the present invention.

At FIG. 6 a frustro conical section 61 is provided having an outlet 63 at the apex thereof. A lip 62 is provided around the base of the conical section 61 and has a diameter greater than the diameter of casing 1, as described hereinafter.

Step-spacers 64 are provided as shown, having edge member 69 to receive the bottom of the casing 1 and holes 66 to recieve bolt 67 to be received in holes 65 in casing 1 to retain the deflector assembly on the casing 1. While bolt assemblies are shown in FIG. 6 it will be understood that any convenient means can adopted for use to hold the assembly onto the casing 1.

FIG. 7 is a view of the arrangement in assembled form showing the annular area 68 between the lip 62 and the casing 1 and further shownning the outlet 63 in more detail.

FIG. 8 is a elevational view of a septic tank having a liquid 70 therein where filter 1 and the deflector 61 are located within the unit with the outlet 2 of the casing 1 providing the outlet for the liquid from septic 71.

An inlet 72 is provided for admission of the liquid to the system. As shown, the liquid flow is represented by the arrow A through the annular area 63 into the deflector 61 where the frustro concial deflector provides a settling basin so that the particular matter 73 can be emitted from outlet 62 before the balance of the liquid is processed in the filter system as described herein B4.

The invention claimed is:

1. A filter unit for use in cylindrical casing means adapted to be disposed in a septic tank including: a plurality of stacked disc-dam units to form a cartridge having a longitudinal axis where each disc-dam unit has a generally circular planar base with a chord segment cut away to form a chord edge where the chord edges of each disc-dam is in mutual alignment and first and second sealing edges are formed at the respective ends of the chord edge and the first and second sealing edges are parallel to the longitudinal axis and where each base includes a continuous elongate dam located on one side of the base and extending outwardly therefrom to terminate at a dam top where the elongate dam has a dam first end adjacent said first sealing edge and extends continuously to a dam second end at said second sealing edge to divide said base into an upstream and downstream side; retaining device to hold at least two disc-dam units in stacked relation with the dam top of one disc-dam unit facing one surface of the next base opposite the side carrying the dam wherein said casing means is of selected diameter to receive said filter unit with said longitudinal axis of said filter unit in generally coincident relation with said longitudinal axis of said casing and wherein said casing means includes first and second longitudinal seal means extending generally parallel to said longitudinal axis in spaced relation to engage said first and second sealing edges and outlet means whereby said outlet means communicating with said outlet of said casing.

2. The invention of claim 1 wherein said casing means includes inlet means communicating with said upstream side of said disc-dam units.

3. The invention of claim 2 wherein said inlet is in a bottom wall of said casing and said casing includes seal means to engages the bottom most of said disc-dam units.

4. A filter unit for use in cylindrical casing means adapted to be disposed in a septic tank including: a plurality of stacked disc-dam units to form a cartridge having a longitudinal axis where each disc-dam unit has a generally circular planar base with a chord segment cut away to form a chord edge where the chord edges of each disc-dam is in mutual alignment and first and second sealing edges are formed at the respective ends of the chord edge and the first and second sealing edges are parallel to the longitudinal axis and where each base includes a continuous elongate dam located on one side of the base and extending outwardly therefrom to terminate at a dam top where the elongate dam has a dam first end adjacent said first sealing edge and extends continuously to a dam second end at said second sealing edge to divide said base into an upstream and downstream side; retaining device to hold at least two disc-dam units in stacked relation with the dam top of one disc-dam unit facing one surface of the next base opposite the side carrying the dam longitudinal axis in spaced relation to engage said first and second sealing edges and outlet means whereby said outlet means communicating with said outlet of said casing wherein said casing is cylindrical having an open inlet at the bottom and a frustro conical deflector located over the inlet so liquid can enter the device by flowing through an annular area between the housing and the base of the deflector and solids carried by the liquid are emitted through the opening formed at the apex of the deflector.

* * * * *